March 3, 1942.    P. C. DAY    2,275,250
POWER TRANSMISSION MECHANISM
Filed Jan. 28, 1938
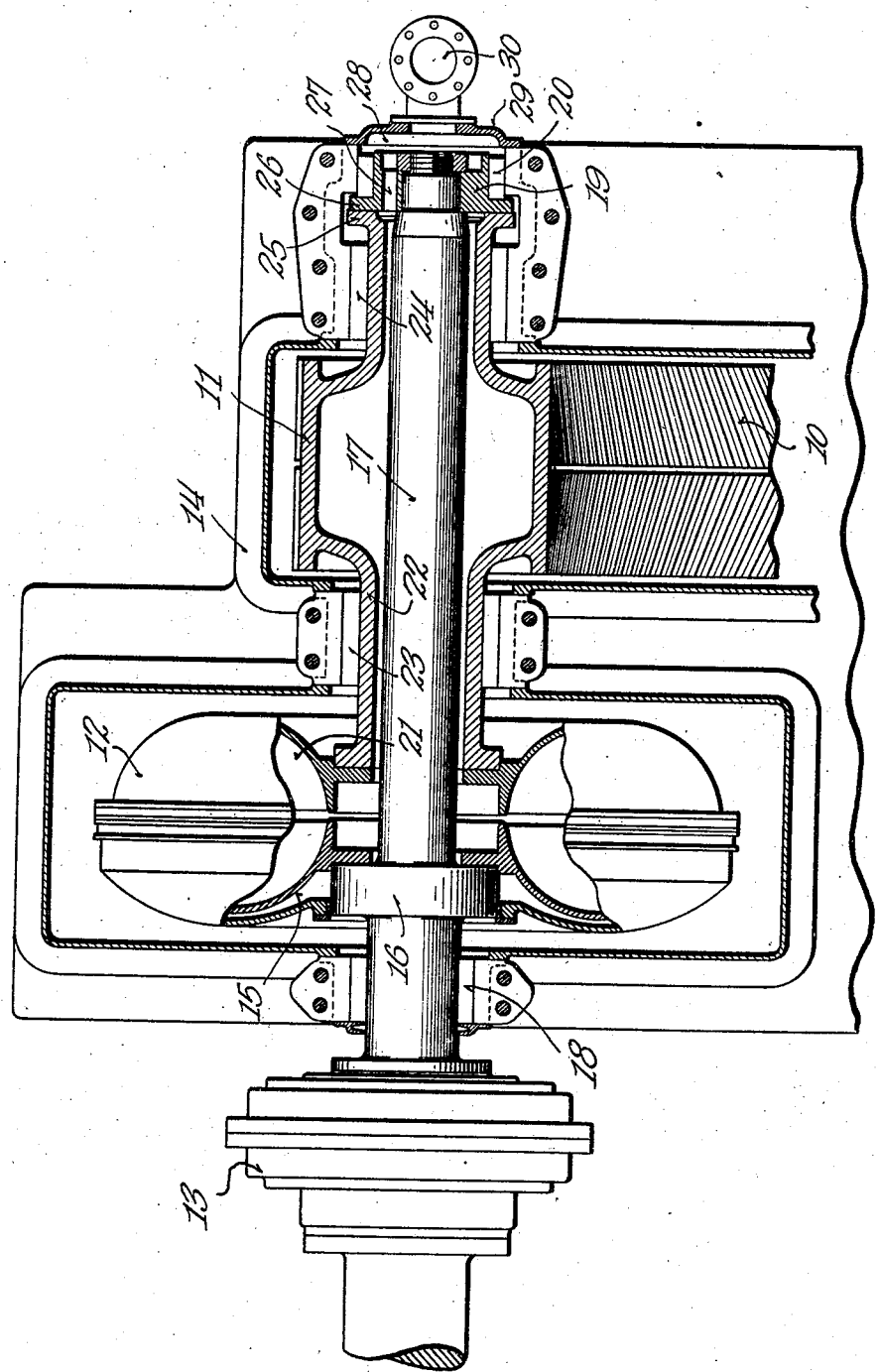
INVENTOR.
PERCY C. DAY
BY
ATTORNEY.

Patented Mar. 3, 1942

2,275,250

UNITED STATES PATENT OFFICE 2,275,250

POWER TRANSMISSION MECHANISM

Percy C. Day, Brookfield, Wis., assignor to The Falk Corporation, Milwaukee, Wis., a corporation of Wisconsin Application January 28, 1938, Serial No. 187,360

1 Claim. (Cl. 60—54)

This invention relates to power transmission mechanisms of the type involving the use of hydraulic couplings.

The ability of a hydraulic coupling to transmit power without transmitting torsional vibrations or torque fluctuations, and the facility afforded thereby for quick clutching and declutching are characteristics which render the use of such a coupling highly desirable in Diesel driven geared power systems. However the axial thrusts ordinarily developed by such couplings present problems which have not been completely solved, particularly when applied to heavy duty power transmission systems involving speed reduction gearing.

One object of the present invention is to provide improved means for sustaining the axial thrusts developed by hydraulic couplings.

Another object is to provide improved means for conducting motivating fluid to or from the interior of the coupling.

Another object is to incorporate a hydraulic coupling and speed reduction gear set in a single rigid supporting structure and in such manner as to sustain the coupling thrusts independently of the support.

Another object is to structurally combine a hydraulic coupling and gear into a self-contained operating unit in which the coupling thrusts are self sustained.

Other more specific objects and advantages will appear, expressed or implied, from the following description of a power transmission mechanism constructed in accordance with the present invention.

The single figure of the accompanying drawing is a fragmentary horizontal sectional view of a power transmitting mechanism embodying the present invention.

The power transmitting mechanism selected for illustration constitutes a part of a marine propulsion system and includes a main gear, partially shown at 10, which is ordinarily directly coupled to a propeller shaft (not shown) and driven by one or more pinions 11 in mesh therewith. The pinion shown is driven from an appropriate power source through a hydraulic coupling 12 and flexible mechanical coupling 13 both of well known types.

In this instance, however, the pinion and hydraulic coupling are structurally combined in a novel manner so as to form an operating unit in which the axial thrusts, characteristic of couplings of this type, are self sustained, independently of the frame or housing 14 in which both are rigidly mounted and enclosed.

In the hydraulic coupling shown, the bladed impeller 15 thereof is fixed to an integral collar 16 on a shaft 17 journalled at one end in an appropriate bearing 18 in the supporting housing and engaged with the flexible coupling 13. The shaft 17 extends through the hydraulic coupling and pinion 11 and is supported at its other end by a collar 19 securely anchored thereto and journalled in an appropriate bearing 20 in the supporting housing. The bladed runner 21 is secured to and supported by a quill shaft 22, encircling and spaced from the shaft 17 and carrying the pinion 11. The quill shaft 22 is supported at one end in a rigid bearing 23 disposed between the runner 21 and one end of the pinion 11 and at the other end in a rigid bearing 24 disposed adjacent the other end of the pinion.

It is of course understood that in hydraulic couplings of this type the contained fluid reacts on the impeller 15 and runner 21 to set up axial thrusts tending to separate them. In this instance an appropriate thrust bearing is provided through which the axial thrust transmitted to the shaft 17 from the impeller 15 is counteracted by the opposite axial thrust transmitted to the quill shaft 22 from the runner 21. The thrust bearing shown comprises a thrust collar or flange 25 formed on the end of the quill shaft 22 and coacting with a corresponding thrust collar or flange 26 on the collar 19 fixed to the shaft 17.

It will be noted that by the arrangement above described the axial thrusts normally developed by the hydraulic coupling are adequately sustained quite independently of the housing, so that the pinion 11 and coupling 12, together with their supporting shafts, may be mounted for free axial movement within the housing, as in the mechanism shown. This is of particular advantage when, as in this instance, the pinion 11 and meshing gear 10 are of the double helical or herringbone type, since the pinion is thus axially free to adjust itself to the gear in a manner to equalize the load on the two helices of both pinion and gear.

In the mechanism shown, the hollow shaft 22, whose inner end is open to the interior of the coupling 12, is also advantageously utilized as a means for conducting motivating fluid to and from the coupling. For this purpose one or more passages 27, through the collar 19, afford communication between the shaft 22 and a chamber 28 formed between the collar 19 and a bearing cover plate 29 attached to the housing. The plate 29 carries an appropriate pipe or elbow 30 through which fluid may be introduced into the chamber 28 and shaft 22 from an appropriate source.

Various changes may be made in the embodiment of the invention hereinabove specifically described without departing from or sacrificing the advantages of the invention as defined in the appended claim.

I claim:

In a power transmission the combination of two bladed rotors coacting to form a hydraulic coupling, a hollow shaft carrying one of said rotors and providing a conduit for supplying fluid to said coupling, a second shaft carrying the other of said rotors and extending axially of and within said hollow shaft, and a thrust bearing carried by one of said shafts and having an annular bearing face coacting with an annular bearing face on the other of said shafts to sustain the axial thrust developed by said coupling, said bearing being exposed to the fluid in said hollow shaft so that said faces are lubricated thereby.

PERCY C. DAY.